(12) United States Patent
Holman et al.

(10) Patent No.: US 10,620,696 B2
(45) Date of Patent: Apr. 14, 2020

(54) APPARATUS AND METHOD FOR SENSING DEFORMATION

(71) Applicant: Tactual Labs Co., New York, NY (US)

(72) Inventors: David Holman, Toronto (CA); Bruno Rodrigues De Araujo, Toronto (CA); Ricardo Jorge Jota Costa, Toronto (CA); David Clark Wilkinson, Austin, TX (US)

(73) Assignee: Tactual Labs Co., New York, NY (US)

( * ) Notice: Subject to any disclaimer, the term of this patent is extended or adjusted under 35 U.S.C. 154(b) by 15 days.

(21) Appl. No.: 15/904,953

(22) Filed: Feb. 26, 2018

(65) Prior Publication Data

US 2018/0267599 A1 Sep. 20, 2018

Related U.S. Application Data

(60) Provisional application No. 62/621,117, filed on Jan. 24, 2018, provisional application No. 62/473,908, filed on Mar. 20, 2017, provisional application No. 62/488,753, filed on Apr. 22, 2017, provisional application No. 62/533,405, filed on Jul. 17, 2017, provisional application No. 62/588,267, filed on Nov. 17, 2017, provisional application No. 62/588,148, filed on Nov. 17, 2017.

(51) Int. Cl.
*G06F 3/01* (2006.01)
*H01Q 1/27* (2006.01)
*H01Q 21/28* (2006.01)
*H01Q 21/30* (2006.01)

(52) U.S. Cl.
CPC .............. *G06F 3/011* (2013.01); *G06F 3/017* (2013.01); *H01Q 1/273* (2013.01); *H01Q 21/28* (2013.01); *H01Q 21/30* (2013.01)

(58) Field of Classification Search
None
See application file for complete search history.

(56) References Cited

U.S. PATENT DOCUMENTS

| | | | |
|---|---|---|---|
| 2011/0187637 A1* | 8/2011 | Nichols | G06F 3/044 345/156 |
| 2012/0139708 A1* | 6/2012 | Paradiso | G06F 3/014 340/10.1 |
| 2017/0296363 A1* | 10/2017 | Yetkin | A61F 2/72 |
| 2018/0253151 A1* | 9/2018 | Kletsov | G01S 7/412 |

* cited by examiner

*Primary Examiner* — Joseph R Haley
(74) *Attorney, Agent, or Firm* — Adam B. Landa

(57) ABSTRACT

Disclosed is a controller for sensing deformation. Transmit antennas are located on a first structure and transmit signals. Receive antennas are located on a second structure and receive signals. Received signals are processed to determine an amount of deformation. The amount of deformation that occurs may then be correlated to the position of a hand or the location of another body part.

16 Claims, 15 Drawing Sheets

APPARATUS AND METHOD FOR SENSING DEFORMATION

This application is related to and claims the benefit of U.S. Provisional Patent Application No. 62/621,117, entitled "Matrix Sensor with Receive Isolation," filed Jan. 24, 2018; U.S. Provisional Patent Application No. 62/473,908, entitled "Hand Sensing Controller," filed Mar. 20, 2017; U.S. Provisional Patent Application No. 62/488,753, entitled "Heterogenous Sensing Apparatus and Methods" filed on Apr. 22, 2017; U.S. Provisional Patent Application No. 62/533,405, entitled "Apparatus and Methods for Enhancing Digit Separation and Reproduction" filed on Jul. 17, 2017; U.S. Provisional Patent Application No. 62/588,267, entitled "Sensing Controller" filed on Nov. 17, 2017; and U.S. Provisional Patent Application No. 62/588,148, entitled "Systems and Methods for Infusion Range Sensor" filed on Nov. 17, 2017, the contents of all the aforementioned applications hereby incorporated herein by reference.

FIELD

The disclosed apparatus and methods relate in general to the field of human-machine interface controllers, and in particular to a human-machine interface controller that is sensitive to deformation.

BACKGROUND

In recent years virtual reality (VR) and augmented reality (AR) have become increasingly popular as computational power and immersive possibilities become more common.

Generally, while systems and methods offer ways to interact with VR and AR environments, frequently the mechanism for interacting with these types of environments detracts from the immersive nature.

What is needed are controllers that provide detailed information relative to a user's gestures and other interactions without detracting from the immersiveness of the overall system.

BRIEF DESCRIPTION OF THE DRAWINGS

The foregoing and other objects, features, and advantages of the disclosure will be apparent from the following more particular description of embodiments as illustrated in the accompanying drawings, in which reference characters refer to the same parts throughout the various views. The drawings are not necessarily to scale, emphasis instead being placed upon illustrating principles of the disclosed embodiments.

DETAILED DESCRIPTION

Figure 1:
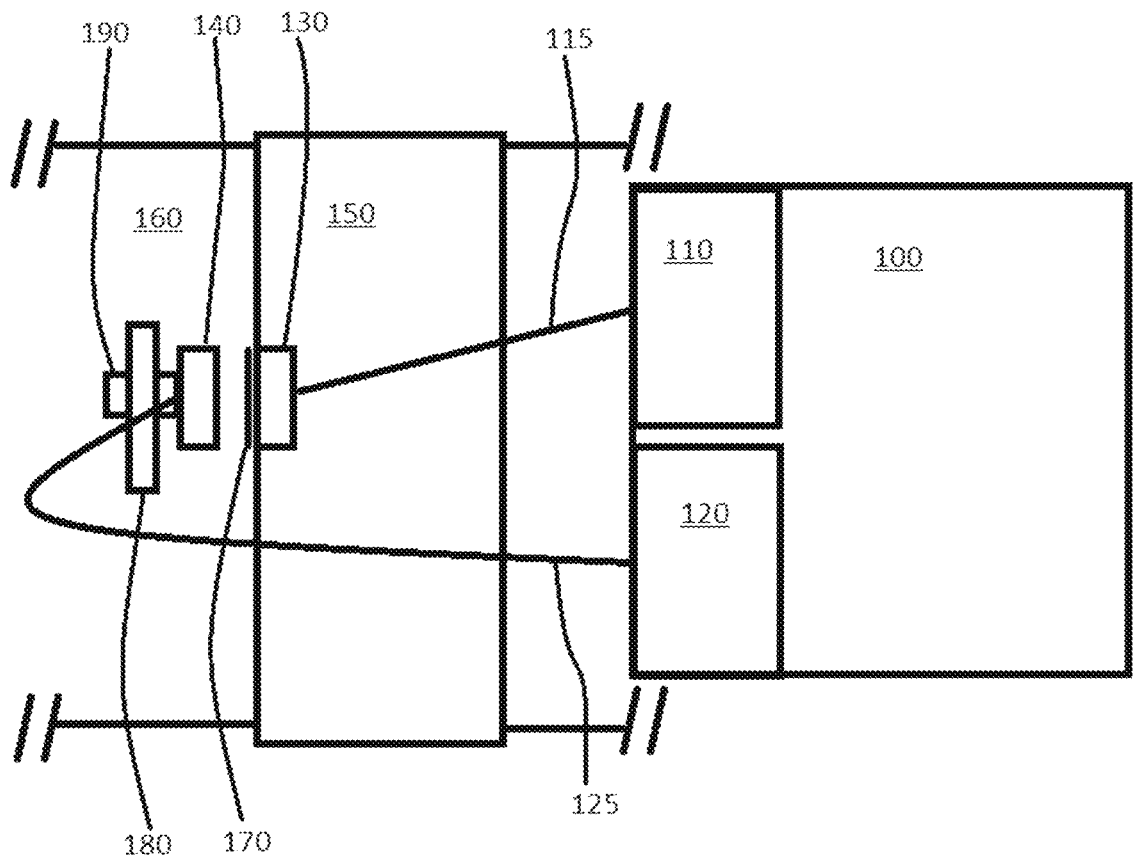
FIG. 1 shows a diagram illustrating the interaction of components of an embodiment of a controller.
Figure 2:
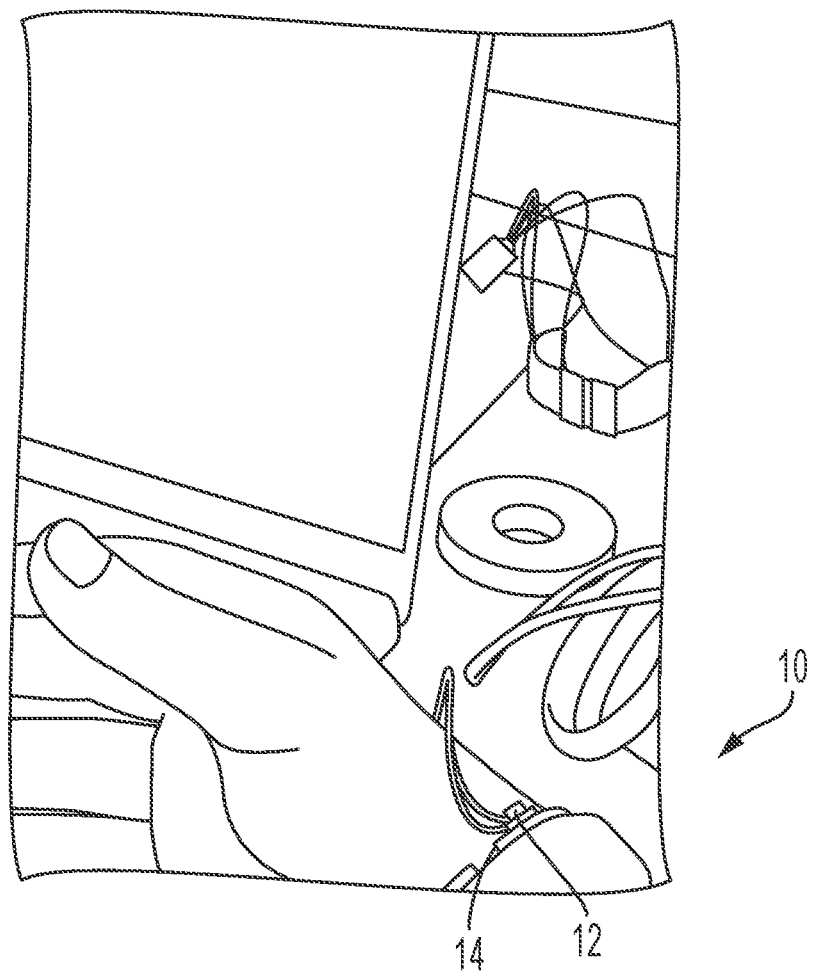
FIG. 2 shows an embodiment of a controller located on a wrist of a user.
Figure 3:
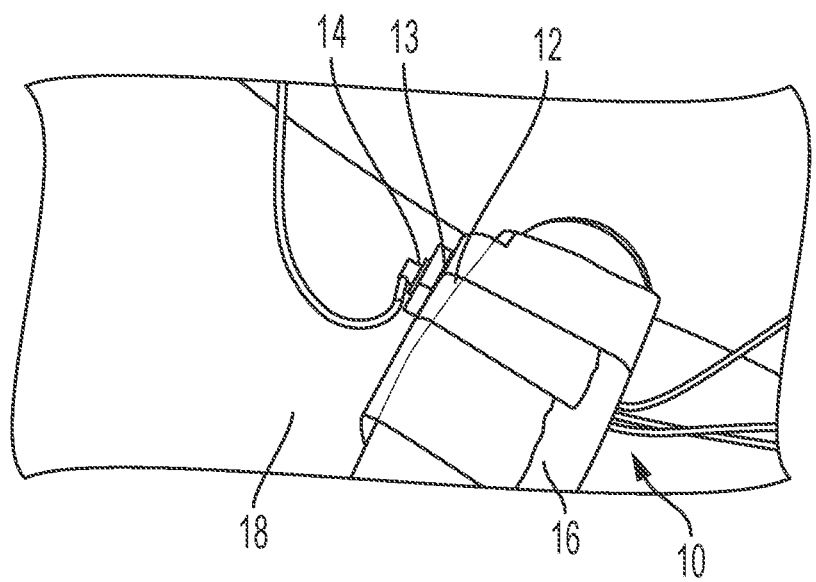
FIG. 3 shows a close up view of the embodiment shown in FIG. 2 of a controller located on the wrist with a receive antenna located in a first position.
Figure 4:
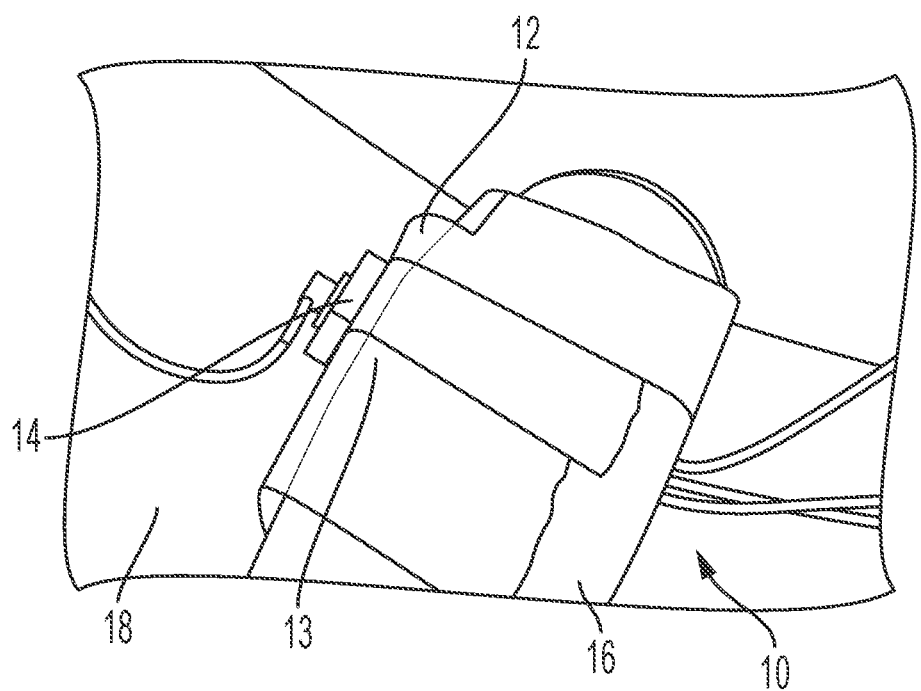
FIG. 4 shows a close up view of the embodiment shown in FIG. 2 of a controller located on the wrist with the receive antenna located in a second position.

This application relates to user interfaces such as found in U.S. Provisional Patent Application No. 62/621,117, entitled "Matrix Sensor with Receive Isolation," The entire disclosure of that application, and the applications incorporated therein by reference, are incorporated herein by reference.

In various embodiments, the present disclosure is directed to motion sensing controllers, and methods for designing, manufacturing and operating motion controllers (e.g, hand movement controllers), and in particular controllers using signals to determine an amount of deformation of a surface in order to model motion of a body part. Throughout this disclosure, various controller shapes and sensor patterns are used for illustrative purposes. Although example compositions and/or geometries are disclosed for the purpose of illustrating the invention, other compositions and geometries will be apparent to a person of skill in the art, in view of this disclosure, without departing from the scope and spirit of the disclosure herein.

An embodiment is an apparatus having a first plurality of antennas each being supported on a first structure adapted to be worn on a wrist, the first structure adapted to permit at least one of the first plurality of antennas to move with respect to another one of the first plurality of antennas due to deformation of the first structure. A signal transmitter is operatively connected to each of a first set of the first plurality of antennas, the first set comprising at least two of the first plurality of antennas, the signal transmitter being configured to generate each of a first plurality of frequency-orthogonal signals on each of the first set of the first plurality of antennas, respectively. A signal processor is operatively connected to each of a second set of the first plurality of antennas, the second set comprising at least two of the first plurality of antennas, the signal processor being configured to process signals received on the second set of the first plurality of antennas during a plurality of integration periods, and for each of the plurality of integration periods and for each of the second set of the first plurality of antennas, to determine a measurement corresponding to each signal generated on each of the first set of the first plurality of antenna. A movement of a hand can be determined based on the measurements corresponding to the plurality of integration periods.

An embodiment is a method comprising the steps of generating signals with a signal transmitter operatively connected to each of a first set of a first plurality of antennas, the first set comprising at least two of the first plurality of antennas, the signal transmitter being configured to generate each of a first plurality of frequency-orthogonal signals on each of the first set of the first plurality of antennas, respectively. Receiving signals on a second set of the first plurality of antennas, the second set comprising at least two of the first plurality of antennas, wherein each of the first set and the second set of the first plurality of antennas being supported on a first structure adapted to be worn on a wrist, the first structure adapted to permit at least one of the first plurality of antennas to move with respect to another one of the first plurality of antennas due to deformation of the first structure. Processing signals with a signal processor operatively connected to each of the second set of the first plurality of antennas, the signal processor being configured to process signals received on the second set of the first plurality of antennas during a plurality of integration periods. Determining a measurement corresponding to each signal generated on each of the first set of the first plurality of antennas for each of the plurality of integration periods and for each of the second set of the first plurality of antennas. Determining movement of the hand based on the measurements corresponding to the plurality of integration periods.

An embodiment is an apparatus having a first plurality of antennas each being supported on a first structure adapted to be worn on a wrist. A signal transmitter operatively connected to at least one of the first plurality of antennas, the at least one of the first plurality of antennas being configured to transmit a signal into skin. A signal processor operatively connected to each of a second plurality of antennas, the signal processor being configured to process signals received on the second plurality of antennas to determine a measurement corresponding to each signal generated by the at least one of the first plurality of antennas. A movement of a hand can be determined based on the measurements corresponding to each signal generated by the at least one of the first plurality of antennas.

Throughout this disclosure, the terms "deformation," or other descriptors may be used to describe events or periods of time in which a human-machine interaction takes place, i.e., a user's deformation of skin surface in the wrist area. In accordance with an embodiment, "deformation" may be detected, processed and supplied to downstream computational processes with very low latency, e.g., on the order of ten milliseconds or less, or on the order of less than one millisecond.

As used herein, and especially within the claims, ordinal terms such as first and second are not intended, in and of themselves, to imply sequence, time or uniqueness, but rather, are used to distinguish one claimed construct from another. In some uses where the context dictates, these terms may imply that the first and second are unique. For example, where an event occurs at a first time, and another event occurs at a second time, there is no intended implication that the first time occurs before the second time. However, where the further limitation that the second time is after the first time is presented in the claim, the context would require reading the first time and the second time to be unique times. Similarly, where the context so dictates or permits, ordinal terms are intended to be broadly construed so that the two identified claim constructs can be of the same characteristic or of different characteristic. Thus, for example, a first and a second frequency, absent further limitation, could be the same frequency, e.g., the first frequency being 10 Mhz and the second frequency being 10 Mhz; or could be different frequencies, e.g., the first frequency being 10 Mhz and the second frequency being 11 Mhz. Context may dictate otherwise, for example, where a first and a second frequency are further limited to being orthogonal to each other in frequency, in which case, they could not be the same frequency.

The term "controller" as used herein is intended to refer to a physical object that provides the function of human-machine interface. In an embodiment, the controller is a wristband. In an embodiment, the controller is able to detect the movements of a hand through detection of the deformation of surface areas of the wrist area. In an embodiment, the controller is able to detect the movements of a hand through detection of the movement of the wrist area. In an embodiment, the controller is able to detect the movements of a hand by sensing such movements directly. See, e.g., U.S. Provisional Patent Application No. 62/473,908, entitled "Hand Sensing Controller," filed Mar. 20, 2017; U.S. Provisional Patent Application No. 62/488,753, entitled "Heterogenous Sensing Apparatus and Methods" filed on Apr. 22, 2017; and U.S. Provisional Patent Application No. 62/588,267, entitled "Sensing Controller" filed on Nov. 17, 2017. In an embodiment, the controller may provide the position of a hand through the determination of deformation of surface areas in the wrist area. In an embodiment, the controller may provide position and/or movement of other body parts through the determination of deformation of surface areas proximate to and/or associated with the body part and/or function, e.g., the articulation of the bones, joints and muscles of the wrist area and how it translates into the position and/or movement of the hand; the articulation of the bones, joints and muscles of the ankle area and how it translates into position and/or movement of the foot; the vibration and movement of the vocal cords and how it translates into speech.

The controllers discussed herein use first antennas and second antennas. The first antennas and second antennas can be transmitters and receivers. However, it should be understood that whether the first antenna (or second antenna) is a transmitter, a receiver, or both depends on context and the embodiment. In an embodiment, the transmitters and receivers for all or any combination of the patterns are operatively connected to a single integrated circuit capable of transmitting and receiving the required signals. In an embodiment, the transmitters and receivers are each operatively connected to a different integrated circuit capable of transmitting and receiving the required signals, respectively. In an embodiment, the transmitters and receivers for all or any combination of the patterns may be operatively connected to a group of integrated circuits, each capable of transmitting and receiving the required signals, and together sharing information necessary to such multiple IC configuration. In an embodiment, where the capacity of the integrated circuit (i.e., the number of transmit and receive channels) and the requirements of the patterns (i.e., the number of transmit and receive channels) permit, all of the the transmitters and receivers for all of the multiple patterns used by a controller are operated by a common integrated circuit, or by a group of integrated circuits that have communications therebetween. In an embodiment, where the number of transmit or receive channels requires the use of multiple integrated circuits, the information from each circuit is combined in a separate system. In an embodiment, the separate system comprises a GPU and software for signal processing.

Turning to FIG. 1, a diagram of an embodiment is shown. In an embodiment, a mixed signal integrated circuit 100 with signal processing capabilities comprises a transmitter 110, and a receiver 120. (In an embodiment, an analog front end comprising a transmitter (or multiple transmitters) and a receiver (or multiple receivers) is used to send and receive signals instead of the mixed signal integrated circuit 100. In such an embodiment, the analog front end provides a digital interface to signal generating and signal processing circuits and/or software.)

The transmitter 110 is conductively coupled to transmit antenna 130 via transmit lead 115, and the receiver 120 is conductively coupled to the receive antenna 140 via receive lead 125. The transmit antenna 130 is supported on a first structure 150 that is worn on body part 160. The first structure 150 is worn on or about the body part 160 such that it will move, generally, with the body part 160. In an embodiment, the receive antenna 140 comprises a support 190, that may be separately affixed to the skin of the body part 160, for example, by using tape 180. Alternatively, receive antenna 140 is affixed to a second structure (not shown) that is adapted to move with the movement of the skin of the body part 160, rather than the more gross movements of the body part 160. In an embodiment, the second structure comprises a more flexible material than the first structure.

In an embodiment, a layer of material 170 separates the transmit antenna 130 and the receive antenna 140. In an embodiment, the layer of material 170 is a layer of dielectric material. In an embodiment, the layer of material 170 is a layer of polyamide film such as Kapton® (a registered trademark of the E. I. Du Pont de Nemours and Company Corporation of Delaware) or another polyimide. Alternatively, the layer of material 170 may be another material, such as, for example paper, mylar, etc. In an embodiment, the layer of material 170 may be omitted. In an embodiment, multiple layers of material may be used, such as, for example, a layer may be used on each of the receive antenna 140 and the transmit antenna 130.

It will be apparent to a person of skill in the art in view of this disclosure that the transmitter and receivers are arbitrarily assigned, and the transmitter 110, transmit lead 115 and transmit antenna 130 can be used the receive side, while the receiver 120, receive lead 125 and the receive antenna 140 can be used as the transmit side. It will also be apparent to a person of skill in the art in view of this disclosure that the signal processor, transmitter and receiver may be implemented on separate circuits. It will be apparent to a person of skill in the art in view of this disclosure that the transmitter and receivers may support more than one antenna. In an embodiment, a plurality of transmit antenna 130 and/or a plurality of receive antenna 140 are employed. In an embodiment, multiple transmit antenna are supported on the first structure. In an embodiment, multiple receive antenna are supported on a second structure. In an embodiment, both transmit and receive antenna are supported on the first structure. In an embodiment, both transmit and receive antenna are supported on a second structure.

In an embodiment, the mixed signal integrated circuit 100 is adapted to generate one or more signals and send the signals to the transmit antenna 130 via the transmitter 110. In an embodiment, the mixed signal integrated circuit 100 is adapted to generate a plurality of frequency-orthogonal signals and send the plurality of frequency-orthogonal signals to the transmit antenna 130. In an embodiment, the mixed signal integrated circuit 100 is adapted to generate a plurality of frequency-orthogonal signals and one or more of the plurality of frequency-orthogonal signals to each of a plurality of transmit antenna. In an embodiment, the frequency-orthogonal signals are in the range from DC up to about 2.5 GHz. In an embodiment, the frequency-orthogonal signals are in the range from DC up to about 1.6 MHz. In an embodiment, the frequency-orthogonal signals are in the range from 50 KHz to 200 KHz. The frequency spacing between the frequency-orthogonal signals should be greater than or equal to the reciprocal of the integration period (i.e., the sampling period).

In an embodiment, the mixed signal integrated circuit 100 (or a downstream component or software) is adapted to determine at least one value representing each frequency orthogonal signal transmitted by a transmit antenna 130. In an embodiment, the mixed signal integrated circuit 100 (or a downstream component or software) performs a Fourier transform received signals. In an embodiment, the mixed signal integrated circuit 100 is adapted to digitize received signals. In an embodiment, the mixed signal integrated circuit 100 (or a downstream component or software) is adapted to digitize received signals and perform a discrete Fourier transform (DFT) on the digitized information. In an embodiment, the mixed signal integrated circuit 100 (or a downstream component or software) is adapted to digitize received signals and perform a Fast Fourier transform (FFT) on the digitized information.

In an embodiment, received signals are sampled at at least 1 MHz. In an embodiment, received signals are sampled at at least 2 MHz. In an embodiment, received signals are sampled at 4 Mhz. In an embodiment, received signals are sampled at more than 4 MHz.

To achieve KHz sampling, for example, 4096 samples may be taken at 4.096 MHz. In such an embodiment, the integration period is 1 millisecond, which per the constraint that the frequency spacing should be greater than or equal to the reciprocal of the integration period provides a minimum frequency spacing of 1 KHz. In an embodiment, the frequency spacing is equal to the reciprocal of the integration period. (It will be apparent to one of skill in the art in view of this disclosure that taking 4096 samples at e.g., 4 MHz would yield an integration period slightly longer than a millisecond, and not not achieving kHz sampling, and a minimum frequency spacing of 976.5625 Hz.) In such an embodiment, the maximum frequency of a frequency-orthogonal signal range should be less than 2 MHz. In such an embodiment, the practical maximum frequency of a frequency-orthogonal signal range should be less than about 40% of the sampling rate, or about 1.6 MHz. In an embodiment, an FFT is used to transform the digitized received signals into bins of information, each reflecting the frequency of a frequency-orthogonal signal transmitted which may have been transmitted by the transmit antenna 130. In an embodiment 4096 bins correspond to frequencies from 1 KHz to about 4 MHz. It will be apparent to a person of skill in the art in view of this disclosure that these examples are simply that, exemplary. Depending on the needs of a system, and subject to the constraints described above, the sample rate may be increased or decrease, the integration period may be adjusted, the frequency range may be adjusted, etc.

In an embodiment, the first structure 150 is a bracelet worn on the wrist body part 160. In an embodiment, the first structure 150 is a nylon bracelet worn on the wrist body part 160. In an embodiment, a second structure is a thin layer of elastic material such as rubber or silicon that will move with the skin of the body part 160.

In an embodiment, the sensor system of FIG. 1 is deployed on a user. As the user moves, changes in the position and orientation between the transmit antenna 130 and receive antenna 140 are reflected in the signals received by the receiver 120. In an embodiment, those changes are quantified by the mixed signal integrated circuit 100 or downstream circuits or software.

In an embodiment, even minute changes in the position and orientation of the transmit antenna 130 and the receive antenna 140 are reflected in the signals received by the receiver and can be quantified by the mixed signal integrated circuit 100 or downstream circuits or software.

In an embodiment, quantified changes can be used to determine a position or motion of a body part such as wrist body part 160. In an embodiment, quantified changes can be used to determine a position or motion of a body part such as the articulation of the bones, joints, tendons and muscles. In an embodiment, quantified changes can be used to determine a position or motion of a body part such as the articulation of the bones, joints and muscles of the wrist area. In an embodiment, quantified changes can be used to determine the position and/or movement of a hand, wrist, foot, ankle, head, neck, torso, arm, shoulder, or any other body part, or a portion of a body part. In an embodiment, quantified changes can be used to determine elastic movement of skin in relation to a body or body part. In an embodiment, quantified changes can be used to determine the vibration and movement of vocal cords. In an embodiment, quantified changes can be used to deduce sounds or speech from the vibration and movement of vocal cords. In an embodiment, quantified changes can be used to determine respiration, heart activity, pulse or other biomechanical changes.

In an embodiment, multiple receive antennas and multiple transmit antennas are interspersed on a first and second structure. In an embodiment, antenna are formed as three-dimensional objects (or the faces of such three-dimensional objects), examples of which include: cubes, rectangular prisms, triangular prisms, octagonal prisms, tetrahedrons, square pyramids, cylinders and cones. In such embodiment, interleaving in two or more dimensions is possible. For example, 2 mm cubes could be placed e.g., 2 mms apart in a two dimensional grid on a skin-tracking second structure that is, e.g. 1" wide and worn on the wrist, while another layer of similar cubes could be deployed in a less flexible second structure that is ½" wide, and which circumscribes first, but is affixed so that it generally covers only the center ½" of the second structure. In an embodiment, a large dense array of e.g., alternating transmitters and receivers can interact. Using the mixed signal integrated circuit 100 described above, or another system that can transmit and receive frequency-orthogonal signals, and detect changes in signal interaction, a great deal about hand and wrist motion can be gleaned. In an embodiment, each transmitting antenna can be used to transmit a plurality of frequency-orthogonal signals. In an embodiment, the location of transmitting antenna and receiving antenna can be dynamically re-configured, allowing each antenna to operate as either a transmitter or a receiver during any integration period. In an embodiment, an antenna can be used as both a transmitter and a receiver (albeit of different frequency-orthogonal signals) during a single integration period. In an embodiment, two groups of antenna are used as both transmitters and receivers during the same integration period; the first group of antenna has its received signals passed through a high pass filter and are used to transmit only low frequencies, while the second group of antenna has its received signals passed through a low pass filter and transmit only high frequencies.

Turning to FIGS. 2-5, an embodiment of a controller 10 is shown. The controller 10 has transmit antenna 12 and receive antenna 14. In an embodiment, the transmit antenna 12 is a conductive plate that is secured to a location on a first structure 16, which may be made from or be a first material. In an embodiment, the first material may be a fabric band. In an embodiment, the fabric of the band is nylon. In an embodiment, the receive antenna 14 is a conductive plate that is secured to a location on a second structure 18, which may be made from or be a second material. In an embodiment, the second material is human skin.

The transmit antenna 12 and the receive antenna 14 are located proximate to each other to permit signalling between the two. In an embodiment, dielectric material 13 is located between the transmit antenna 12 and the receive antenna 14. In an embodiment the dielectric material 13 is Kapton® tape. It should be understood that other dielectric materials 13 may be used, and their use is optional. In an embodiment, a dielectric material is used to create a minimum distance between the transmit antenna 12 and the receive antenna 14. In an embodiment, a dielectric material is deformable, and is used to create a nominal (e.g., touching but not compressed) and a minimum (e.g., dielectric material fully compressed) distances. In an embodiment, signal changes between the nominal and minimum distances can be used to determine pressure, and thus, can be used to infer movement of the sensed skin or body. In an embodiment, a flexible dielectric material is used, such as, for example, velostat (vinyl doped with carbon).

In an embodiment, the first structure 16 has a "stiffness" that is different than the second structure 18. "Stiffness," generally, is a property of the displacement produced by a force along the same degree of freedom, e.g., the change in length of stretched spring. In the international system of units this property is typically measured in newton per meter. This property is also known as Young's modulus (or elastic modulus).

In an embodiment, the manner of supporting the transmit antenna 12 (e.g., on the first structure 16) and the manner of supporting the receive antenna 14 (e.g., on the second structure 18 which may be skin) is intended to cause at least some movements of a body part (e.g., hand or wrist) to result in a change in the relative orientation of the transmit antenna 12 and the receive antenna 14. In an embodiment, the stiffness of the first structure 16 and second structures 18 are different, and thus, at least some movements of a body part (e.g., hand or wrist) result in a change in the relative orientation of the transmit antenna 12 and the receive antenna 14.

In an embodiment, the stiffness of the first structure 16 is greater than the stiffness of second structure 18. In an embodiment, the stiffness of a first structure is less than the stiffness of a second structure. In an embodiment, the stiffness of the first structure is the same as the stiffness of the second structure, but the first structure and the second structure are configured to permit at least some movements of a body part (e.g., hand or wrist) to result in a change in the relative orientation of the transmit antenna 12 and the receive antenna 14. In an embodiment, the first structure and the second structure are each separate wristbands positioned one concentric with the other. In an embodiment, the first structure and the second structure are each separate wristbands positioned one adjacent to the other. Many different configurations will be apparent to a person of skill in the art in view of this disclosure.

In an embodiment, the stiffness of a first structure and how it relates to the stiffness of a second structure factors into how the transmit antenna will move in relation to the receive antenna. In an embodiment, the stiffnesses of the materials employed are selected so that deformation of a body part which is desired to be measured causes relative movement between transmit and receive antennas. In an embodiment, the stiffnesses of the materials employed are selected so that deformation of a body part which is desired to be measured can be completely measured by the relative movement between the transmit and the receive antenna. In an embodiment, multiple antennas are used to fully identify the deformation being measured.

Still referring to FIGS. 2-6, in an embodiment, a first signal is transmitted via the transmit antenna 12, and the signals received from the receive antenna 14 are processed to determine a measurement (e.g., magnitude and/or phase) corresponding to the first signal. In an embodiment, the transmit antenna 12 is located on the first structure 16 (nylon wristband) which has greater stiffness than the second structure 18 (skin). In an embodiment, the transmit antenna 12 moves differently than the receive antenna 14 as a consequence of hand motion resulting in the transmit antenna 12 and the receive antenna 14 changing their relative positions and/or orientations. This movement of the receive antenna 14 relative to the transmit antenna 12 may be along any degree of freedom (e.g., pitch, yaw, roll, x, y or z), and may include any combination thereof. In an embodiment, the movement through space of the receive antenna 14 relative to the transmit antenna 12 is related to the deformation of the skin and the body part in the wrist area. In an embodiment, the relative movement may be caused by the expansion, contraction or shifting of the skin in the area, as well as by gross movements of the body (e.g., a twisting or moving wrist). The expansion, contraction and shifting of skin in the wrist area may be caused by, e.g., muscle, ligament or bone movement in the wrist area, articulation of joints in the hand, wrist or arm, blood flow in the wrist area.

The signals received at the receive antenna 14 are processed to determine a measurement (e.g., magnitude and/or phase) corresponding to the signal or signals transmitted via the transmit antenna 12. In an embodiment, the measurement is used to determine or as a component in determining movement of the body in the vicinity of (or having consequence in the vicinity of) the transmit and receive antennas.

Figure 5:
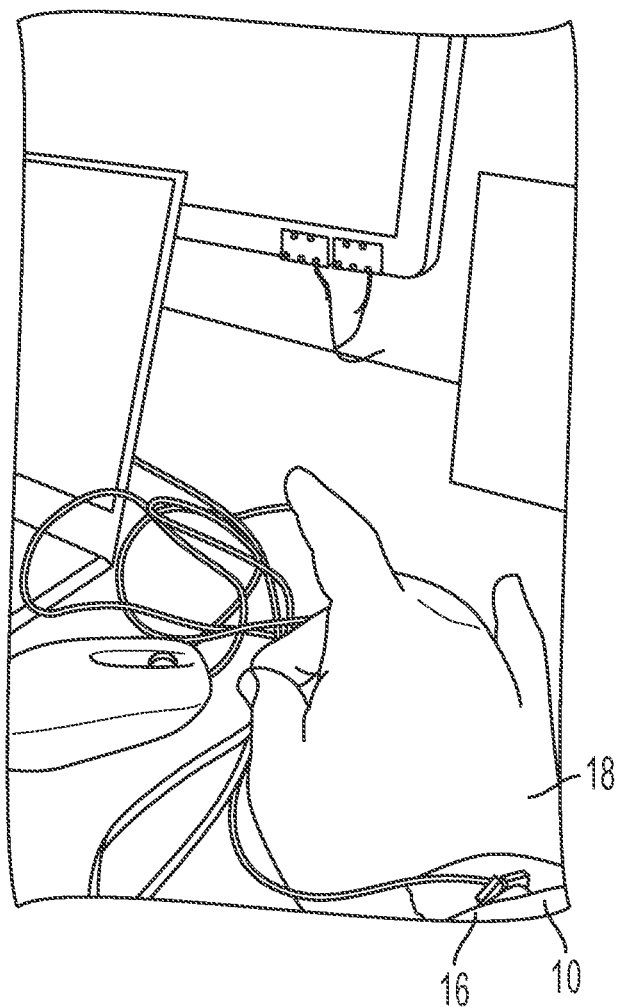
FIG. 5 shows a view of a user's hand forming a gesture that is detected by the controller.

For example, in FIG. 5, deformation in the wrist area caused by contacting a thumb and middle finger is detected by processing the signals received at a receive antenna to determine a measurement (e.g., magnitude and/or phase) corresponding to the signal or signals transmitted via a transmit antenna 12. In an embodiment, the change in signal is used to determine the magnitude of the hand motion. In an embodiment, the change in signal is used to determine a direction of the hand motion. In an embodiment, the change in signal may be used in combination with a constrained model of the hand and skin to determine the motion of the hand. In an embodiment, the change in signal is used in combination with a constrained model of the hand and skin to translate the motion into an VR/AR system.

The transmit antenna 12 and receive antenna 14 can be arranged and formed as part of an antenna array including one or more transmitting antenna and one or more receiving antenna. Generally, more antennas will lead to a better determination of deformation. The placement of antennas so that they move relative to each other as a result of the body movement that is desired to be measured, and not quantity alone, will lead to improved capability for measurement. In an embodiment, antennas are placed in key locations on or proximate to a body part in order to determine deformation. By "proximate" it is generally meant close enough that the antennas are able to provide information regarding the movement of the body part, for example on the wrist area to provide information regarding a hand posture or position. In an embodiment, antennas of an array are placed at specific locations on the wrist area where articulation occurs. In an embodiment, transmit and receive antenna (or transmit and receive antenna groups) are placed on the skin (with no first material), and the stretching of the skin and movement of subdermal structures causes the relative orientation of the antennas to shift, and the consequential signal changes can be used to understand the stretching and movement. In an embodiment, machine learning algorithms are used to associate movement with consequential signal changes, and then to model movement based on such consequential signal changes.

Figure 6:
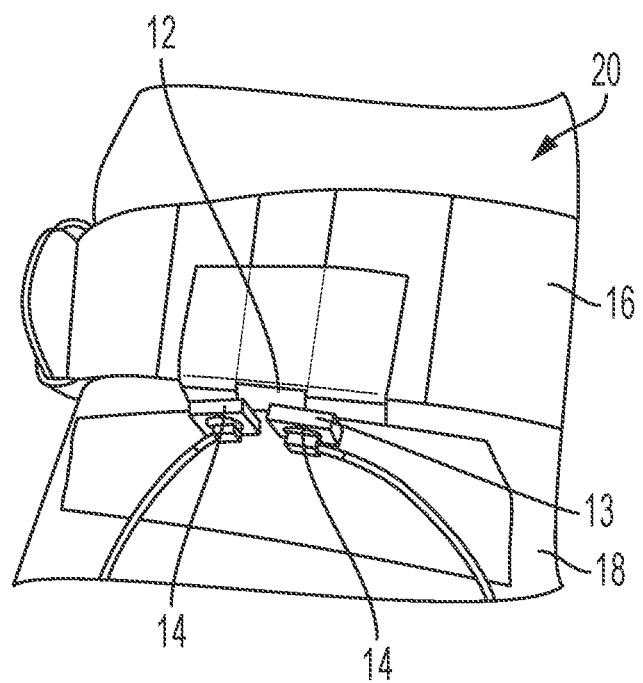
FIG. 6 shows an embodiment of a controller having more than one receive antennas.

Turning to FIG. 6, a controller 20 is shown having more than one receive antenna 14. In an embodiment, two receive antennas 14 are oriented so that, in a relaxed body part state, large surface areas thereof are oriented parallel to a transmit antennas 12. In an embodiment, the use of multiple antennas permits detection of a broader range of deformation. In an embodiment, the use of multiple antennas permits finer resolution detection of deformation. Using multiple antennas to transmit or receive signals provides more points of reference. While rectangular shaped antennas are shown, other geometries are possible such as, for example, rods, curved planes, spheres and toroids. In an embodiment, antenna shapes need not be homogenous, and may vary from one antenna to another.

Figure 7:
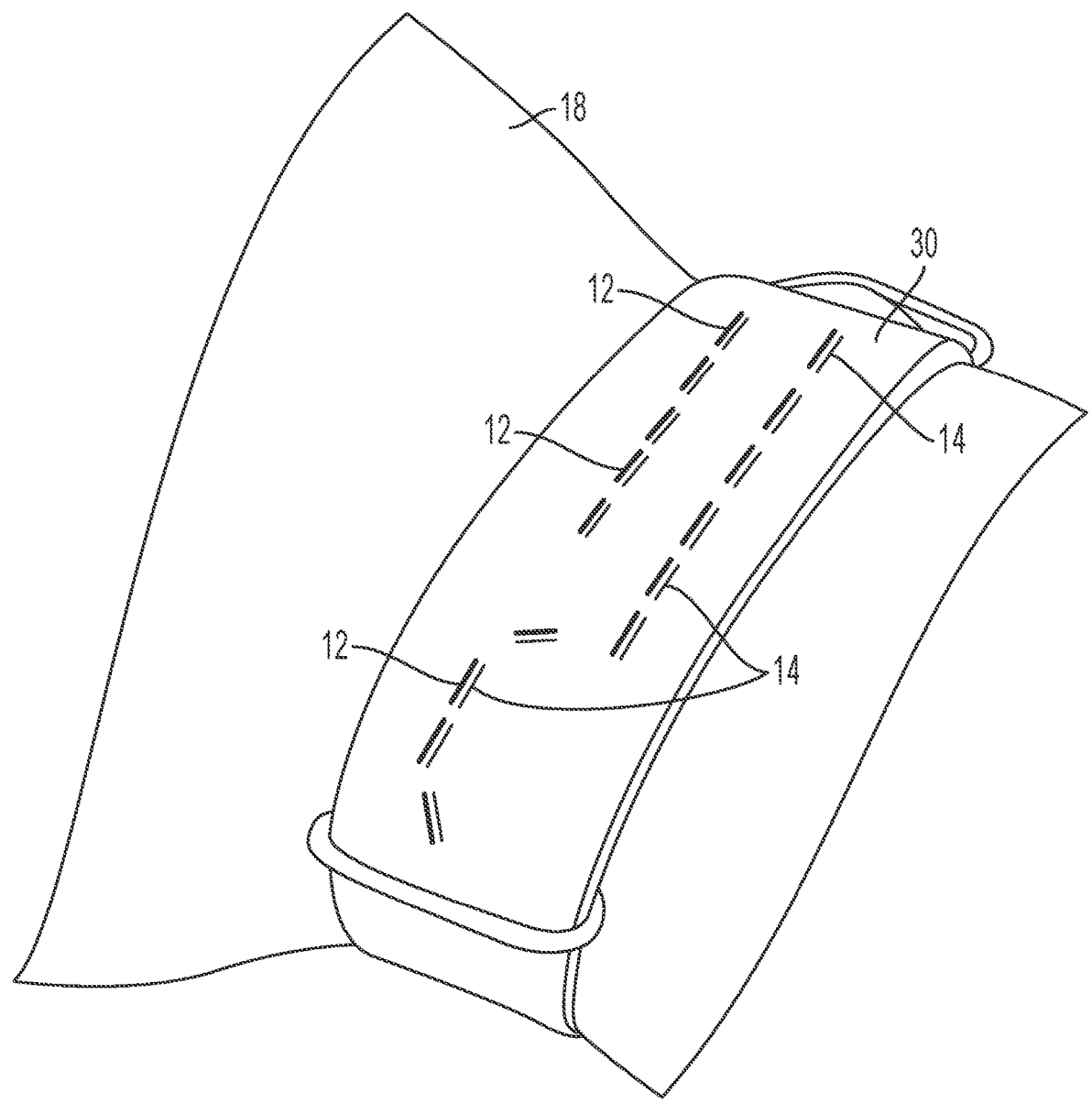
FIG. 7 shows an embodiment of a controller wherein transmit antennas and receive antennas are embedded in a first structure.

Turning to FIG. FIG. 7, a controller 30 is shown. Controller 30 has a plurality of transmit antennas 12 and a plurality of receive antennas 14 located within a band that is worn on a second structure 18, which can be a body part such as a wrist. In an embodiment, the band is made of a flexible material. In an embodiment, the band is made of nylon. In an embodiment, the band is made from a flexible, elastic-type material. In an embodiment, the band is made of neoprene, rubber or silicon. In an embodiment, the band is made of a material comprising neoprene, rubber or silicon. In an embodiment, each of the plurality of transmit 12 are located in proximity to one or more of the plurality of receive antennas 14. In an embodiment, the flexibility and/or elasticity of the band varies across its length or width.

In an embodiment, one or more frequency orthogonal signals are transmitted on each of the transmit antenna 12, and a receiver and signal processor (not shown) is used to process signals received on each receive antenna 14 and provide a measurement corresponding to each of the one or more frequency orthogonal signals for each such receive antenna 14. In an embodiment, movement of the second structure, e.g., the body part, causes deformation of the band, and thus causes changes in the measurement corresponding to each of the one or more frequency orthogonal signals for each such receive antenna 14. In an embodiment, successive measurements can be used to detect deformation of the band. In an embodiment, differences in successive measurements can be used to infer movement of the body part.

In an embodiment, the plurality of transmit antennas 12 and the plurality of receive antennas shown in FIG. 7 may be aligned in rows or other patterns. In an embodiment, the plurality of transmit antennas 12 and the plurality of receive antennas 14 are arranged in matrix arrays. In an embodiment, the plurality of transmit antennas 12 and the plurality of receive antennas 14 comprise conductive thread that is threaded through the band. In an embodiment, a combination of conductive threads and matrix arrays of antennas may be used.

In an embodiment, a second band (not shown) is also provided, the second band being made of a relatively thin, flexible material (e.g., silicone, rubber, neoprene, nylon) that will deform in close relation to the deformation of the skin. In an embodiment, the relatively thin band is also provided with transmit and receive antennas, and worn between the skin and the band shown in FIG. 7. In an embodiment, movement of the second structure 18 causes deformation of the band shown in FIG. 7 and deformation of the relatively thin band. In an embodiment, the band shown in FIG. 7 and the relatively thin band worn thereunder have differing flex and elasticity characteristics, and thus, movement of the second structure 18 causes differing deformation of the two bands. In an embodiment, the transmit antennas 12 in both bands are each used to transmit one or more different frequency orthogonal signals, and the signals received by each receive antenna in each band are processed to determine a measurement for each frequency-orthogonal signal. In an embodiment, measurement corresponding to each of the one or more frequency orthogonal signals for each receive antenna can be used to detect deformation of the bands and their relative spatial changes with respect to each other. In an embodiment, successive measurements can be used to detect deformation of the band. In an embodiment, differences in successive measurements can be used to infer movement of the body part. In an embodiment, machine learning algorithms are used to associate body part movement with signal changes, and then to model movement based on such signal changes.

Figure 8:
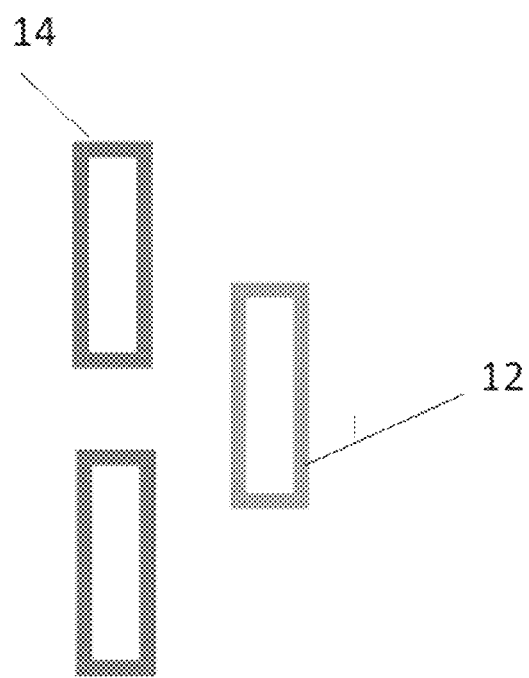
FIG. 8 shows a diagram of an embodiment of an arrangement of antennas arranged in a linear pattern.

FIG. 8 shows a schematic high-level diagram of an embodiment where antenna are arranged in linear patterns. The antenna are offset from each other so that two of the transmit antennas 12 extend over a receive antenna 14 and vice-versa.

Figure 9:
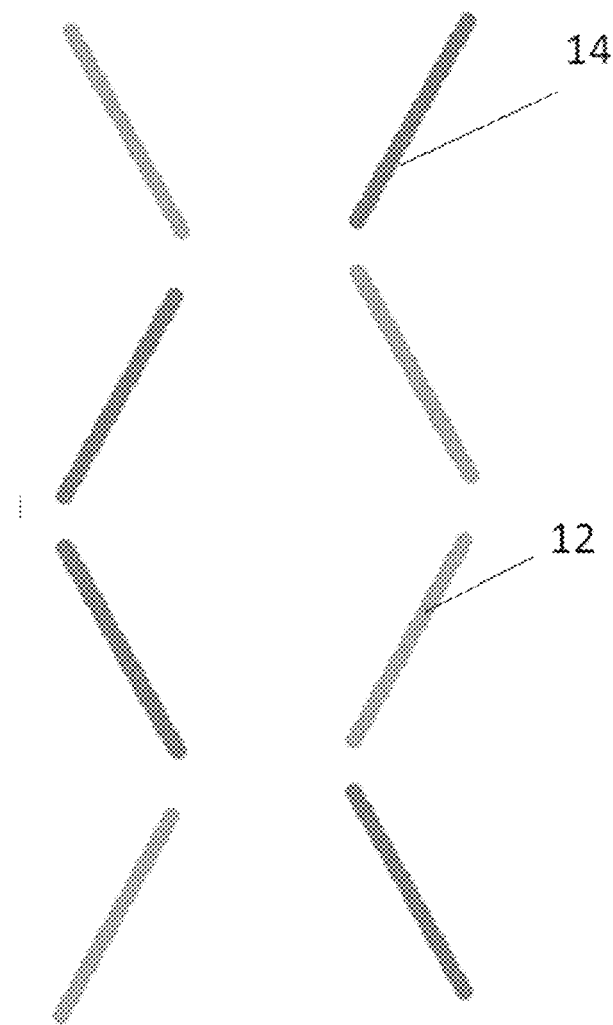
FIG. 9 shows a diagram of an embodiment of an arrangement of antennas arranged in an opposing saw-tooth pattern.

FIG. 9 shows a schematic high-level diagram of an embodiment where antenna are arranged in an opposing saw-tooth pattern. The transmit antennas 12 are angled in opposite directions from the angling of the receive antennas 14.

Figure 10:
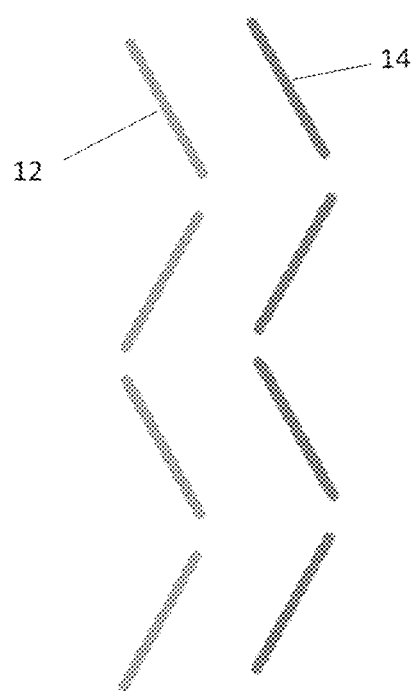
FIG. 10 shows a diagram of an embodiment of an arrangement of antennas arranged in complementary saw-tooth pattern.

FIG. 10 shows a schematic high-level diagram of an embodiment where antenna are arranged in complementary saw-tooth pattern. The transmit antennas 12 are angled in the same direction as the angling of the receive antenna 14.

Figure 11:
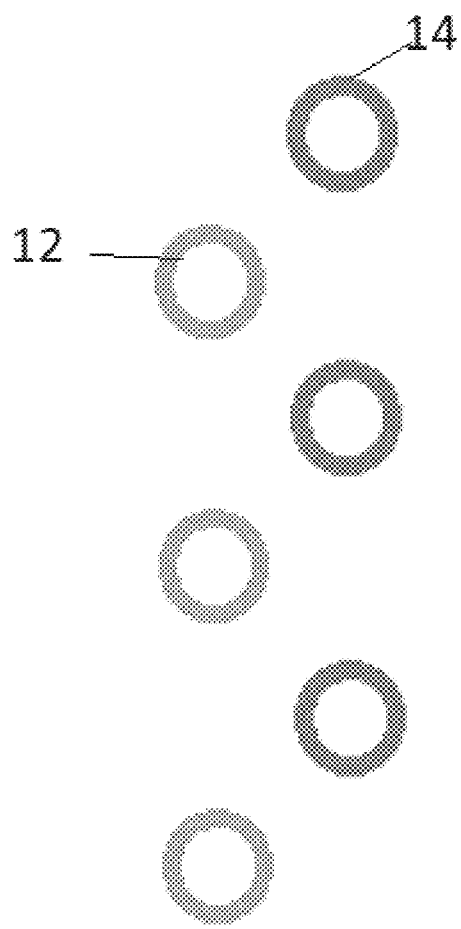
FIG. 11 shows a diagram of an embodiment of an arrangement of antennas arranged in a pattern where the ends of the antennas are extending out of the page.

FIG. 11 shows a schematic high-level diagram of an embodiment where cylindrical antenna are arranged in an alternating pattern. In addition to this orientation it is possible orient antenna in variety of orientations with respect to the surface of a band or other wearable.

Figure 12:
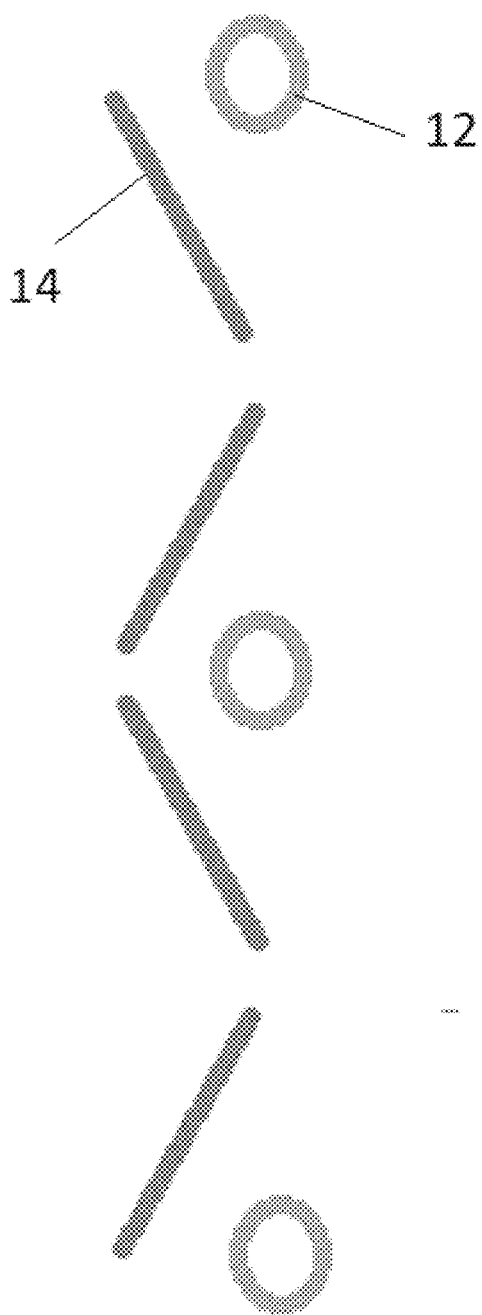
FIG. 12 shows a diagram of an embodiment of an arrangement of antennas where the antennas are arranged in a saw-tooth pattern and the antennas are extending out of the page.

FIG. 12 shows a schematic high-level diagram of an embodiment where non-homogenous antenna are arranged in proximity to each other. In an embodiment antenna are able to interact and detect a variety of movements in the x, y and z axis, as well as potentially detecting pitch, yaw and roll.

Figure 13:
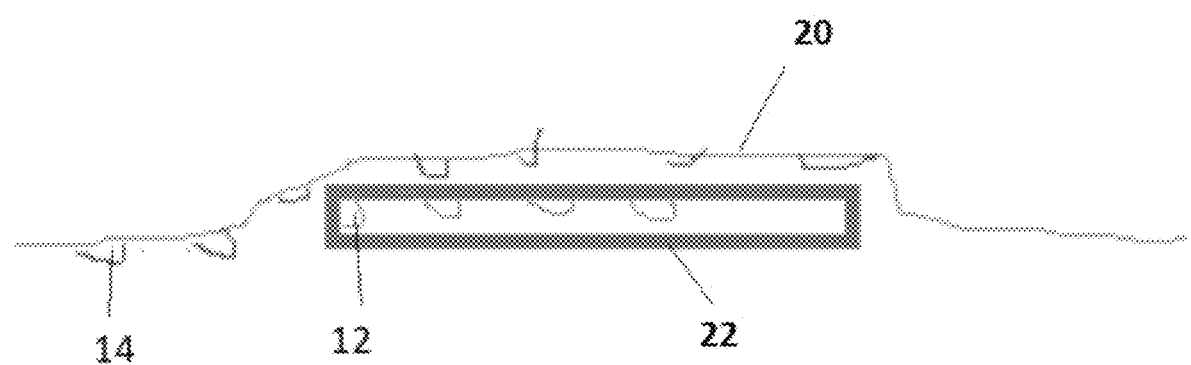
FIG. 13 shows an embodiment of a multi-layer controller.

FIG. 13 shows a schematic high-level diagram of an embodiment of a two-layer controller having antenna 12, 14 arranged at locations of different stiffness. A first band 22 comprises a plurality of transmit antennas 12. A more flexible band 20 comprises a plurality of receive antennas 14. In an embodiment, first band 22 is affixed around a body part (not shown) such as a wrist, and band 20 drapes over first band 22, and the sides of the band 20 engaging the body part. In an embodiment, first band 22 and the more flexible band 20 each comprise a plurality of transmit antennas 12 and receive antennas 14. In an embodiment, relative motions of the plurality of antenna with respect to one-another over time can be used to measure relative movements of the skin and body part, and infer movement or positions of other nearby body parts.

In an embodiment, very small transmit and receive antenna are positioned directly on a variety of nearby locations on the body, and can detect relative movement to one another—and that relative movement can be used to infer movement or positions of nearby body parts. In an embodiment, antenna are affixed to the hair, hair follicles or skin using small amounts of adhesive. In an embodiment, antenna are affixed to a thin structure that is a layer of flexible elastic material that is then secured to the body to act like a second skin, i.e., to move with the skin. In an embodiment, thin layer of flexible elastic material would not interfere with the natural motion of the skin in response to body movement.

Figure 14:
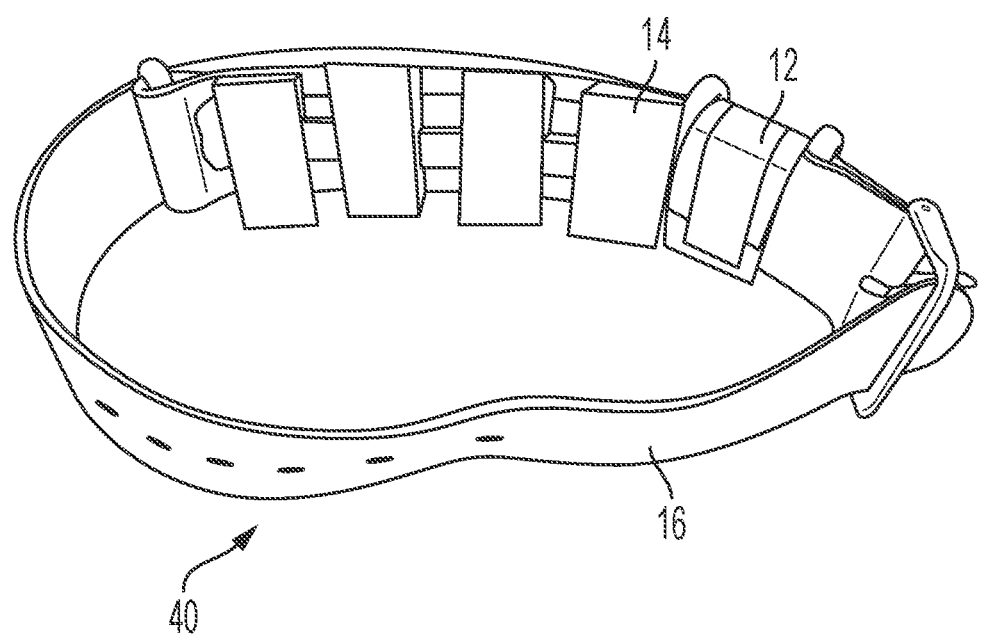
FIG. 14 shows an embodiment of a controller.
Figure 15:
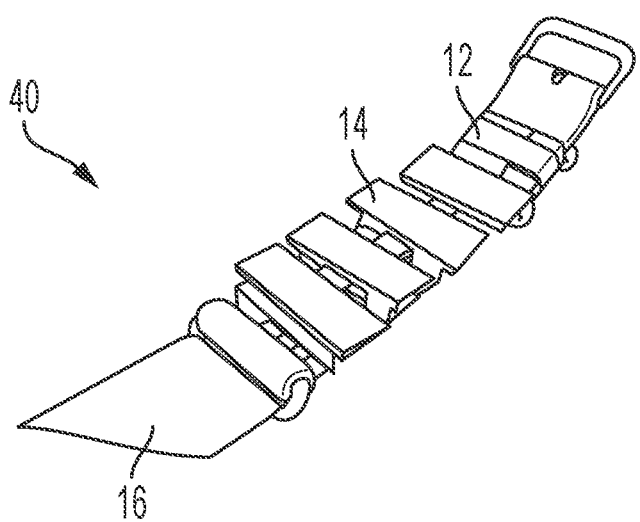
FIG. 15 shows another view of the embodiment shown in FIG. 14.

Turning to FIGS. 14 and 15, a controller 40 is shown. Controller 40 has a transmit antenna 12 and a plurality of receive antennas 14 located on a first structure 16. Transmit antenna 12 injects, or transmits, a signal into the skin. The injection or transmission of a signal into the skin is also referred to as "signal infusion." The receive antennas 14 use received signals to determine the articulation and movements in the wrist area.

In an embodiment, the transmit antenna 12 transmits (signal infuses) the signal directly into the skin. In an embodiment, the transmit antenna 12 transmits (signal infuses) the signal through a medium, e.g., fabric. In an embodiment, the transmit antenna 12 transmits the signal (signal infuses) into the skin proximate to the first structure 16. In an embodiment, the transmit antenna 12 transmits (signal infuses) the signal into the skin from a location elsewhere on the body than where the receivers are, for example the transmit antenna 12 can be on one wrist and the receive antenna on another wrist.

The first structure 16, e.g., a band, is worn on the body part, such as the wrist. In an embodiment, the band is made of a flexible material. In an embodiment, the band is made of nylon. In an embodiment, the band is made from a flexible, elastic-type material. In an embodiment, the band is made of neoprene, rubber or silicon. In an embodiment, the band is made of a material comprising neoprene, rubber or silicon. In an embodiment, the flexibility and/or elasticity of the band varies across its length or width.

In an embodiment, the transmit antenna 12 is located proximate to the body part. In an embodiment, transmit antennas 12 are located at opposite ends of the first structure 16. In an embodiment, a plurality of transmit antennas 12 are used. In an embodiment, the transmit antenna 12 generates more than one signal.

In an embodiment, the transmit antenna 12 transmits signals into the skin and are received by the receiver. A signal processor (not shown) is used to process signals received on each receive antenna 14 and provide a measurement corresponding to each receive antenna 14.

In an embodiment, one or more frequency orthogonal signals are transmitted by each transmit antenna 12, and a signal processor (not shown) is used to process signals received on each receive antenna 14 and provide a measurement corresponding to each of the one or more frequency orthogonal signals for each such receive antenna 14.

In an embodiment, the plurality of receive antennas 14 face the surface of the skin. In an embodiment, the plurality of receive antennas 14 may be aligned in rows or other patterns. In an embodiment, the plurality of receive antennas 12 are arranged in matrix arrays. In an embodiment, the plurality of receive antennas 14 comprise conductive thread that is threaded through the band. In an embodiment, a combination of conductive threads and matrix arrays of antennas may be used.

In an embodiment, movement causes deformation of the second support structure, e.g., skin with respect to the first support structure 16, and thus causes changes in the measurement corresponding to each signals for each such receive antenna 14. In an embodiment, successive measurements are used to detect deformation of the band. In an embodiment, differences in successive measurements are used to infer movement of a body part. In an embodiment, machine learning algorithms are used to associate body part movement with signal changes, and then to model movement based on such signal changes.

In an embodiment, information acquired from one or more antenna from a controller system can provide the basis for providing a model of the user's fingers, hands and wrists in 3D with low latency. The low latency delivery of skeletal models may permit VR/AR system to provide real time renditions of the user's hand. Moreover, the deformation data presented allows application and operating system software to have information from which not only hover, contact, grip, pressure and gesture can be identified via determination of the deformation, but it further provides the hand position and orientation, from which gestural intent may be more easily derived.

It is understood that each block of the block diagrams or operational illustrations, and combinations of blocks in the block diagrams or operational illustrations, may be implemented by means of analog or digital hardware and computer program instructions. Computer program instructions may be provided to a processor of a general purpose computer, special purpose computer, ASIC, or other programmable data processing apparatus, such that the instructions, which execute via a processor of a computer or other programmable data processing apparatus, implements the functions/acts specified in the block diagrams or operational block or blocks.

Except as expressly limited by the discussion above, in some alternate implementations, the functions/acts noted in blocks may occur out of the order noted in any operational illustrations. For example, the order of execution if blocks shown in succession may in fact be executed concurrently or substantially concurrently or, where practical, any blocks may be executed in a different order with respect to the others, depending upon the functionality/acts involved.

While the invention has been particularly shown and described with reference to a preferred embodiment thereof, it will be understood by those skilled in the art that various changes in form and details may be made therein without departing from the spirit and scope of the invention.

What is claimed is:

1. An apparatus comprising:
a first plurality of antennas each being supported on a first structure adapted to be worn on a wrist, the first structure adapted to permit at least one of the first plurality of antennas to move with respect to another one of the first plurality of antennas due to deformation of the first structure;
signal transmitter operatively connected to each of a first set of the first plurality of antennas, the first set comprising at least two of the first plurality of antennas, the signal transmitter being configured to generate each of a first plurality of frequency-orthogonal signals on each of the first set of the first plurality of antennas, respectively;
signal processor operatively connected to each of a second set of the first plurality of antennas, the second set comprising at least two of the first plurality of antennas, the signal processor being configured to process signals received on the second set of the first plurality of antennas during a plurality of integration periods, and for each of the plurality of integration periods and for each of the second set of the first plurality of antennas, to determine a measurement corresponding to each signal generated on each of the first set of the first plurality of antennas; and
wherein a movement of a hand can be determined based on the measurements corresponding to the plurality of integration periods.

2. The apparatus of claim 1, wherein each of the first set of the first plurality of antennas are moveable with respect to at least one of the second set of the first plurality of antennas due to deformation of the first structure.

3. The apparatus of claim 1, further comprising:
a second plurality of antennas each being supported on a second structure adapted to be worn on the wrist proximate to the first structure, the second structure adapted to permit at least one of the second plurality of antennas to move with respect to at least one of the first plurality of antennas due to relative movement of the first structure with respect to the second structure.

4. The apparatus of claim 3, wherein the signal transmitter is further operatively connected to each of a first set of the second plurality of antennas, the signal transmitter being configured to generate each of a second plurality of frequency-orthogonal signals on each of the first set of the second plurality of antennas, respectively, each frequency-orthogonal signal of the second plurality of frequency-orthogonal signals being frequency-orthogonal to each signal of the first plurality of frequency-orthogonal signals.

5. The apparatus of claim 4, wherein the signal processor is further operatively connected to each of a second set of the second plurality of antennas, the signal processor being further configured to process signals received on the second set of the second plurality of antennas during the plurality of integration periods, and for each of the plurality of integration periods and for each of the second set of the second plurality of antennas, to determine a measurement corresponding to each signal generated on each of the second set of the second plurality of antennas.

6. The apparatus of claim 4, wherein each of the second set of the first plurality of antennas are moveable with respect to at least one of the second set of the first plurality of antennas due to deformation of the second structure.

7. The apparatus of claim 4, wherein the signal processor is further configured to process signals received on the second set of the second plurality of antennas during the plurality of integration periods, and for each of the plurality of integration periods and for each of the second set of the second plurality of antennas, to determine a measurement corresponding to each signal generated on each of the second set of the first plurality of antennas.

8. The apparatus of claim 3, wherein the signal processor is further operatively connected to each of a set of the second plurality of antennas, the set of the second plurality of antennas comprising at least two of the second plurality of antennas, the signal processor being further configured to process signals received on the set of the second plurality of antennas during the plurality of integration periods, and for each of the plurality of integration periods and for each of the set of the second plurality of antennas, to determine a measurement corresponding to each signal generated on each of the first set of the first plurality of antennas.

9. A method comprising the steps of:
generating signals with a signal transmitter operatively connected to each of a first set of a first plurality of antennas, the first set comprising at least two of the first plurality of antennas, the signal transmitter being configured to generate each of a first plurality of frequency-orthogonal signals on each of the first set of the first plurality of antennas, respectively;
receiving signals on a second set of the first plurality of antennas, the second set comprising at least two of the first plurality of antennas, wherein each of the first set and the second set of the first plurality of antennas being supported on a first structure adapted to be worn on a wrist, the first structure adapted to permit at least one of the first plurality of antennas to move with respect to another one of the first plurality of antennas due to deformation of the first structure;
processing signals with a signal processor operatively connected to each of the second set of the first plurality of antennas, the signal processor being configured to process signals received on the second set of the first plurality of antennas during a plurality of integration periods;
determining a measurement corresponding to each signal generated on each of the first set of the first plurality of antennas for each of the plurality of integration periods and for each of the second set of the first plurality of antennas; and
determining movement of the hand based on the measurements corresponding to the plurality of integration periods.

10. The method of claim 9, wherein each of the first set of the first plurality of antennas are moveable with respect to at least one of the second set of the first plurality of antennas due to deformation of the first structure.

11. The method of claim 9, further comprising:
a second plurality of antennas each being supported on a second structure adapted to be worn on the wrist proximate to the first structure, the second structure adapted to permit at least one of the second plurality of antennas to move with respect to at least one of the first plurality of antennas due to relative movement of the first structure with respect to the second structure.

12. The method of claim 11, wherein the signal transmitter is further operatively connected to each of a first set of the second plurality of antennas, the signal transmitter being configured to generate each of a second plurality of frequency-orthogonal signals on each of the first set of the second plurality of antennas, respectively, each frequency-orthogonal signal of the second plurality of frequency-orthogonal signals being frequency-orthogonal to each signal of the first plurality of frequency-orthogonal signals.

13. The method of claim 12, wherein the signal processor is further operatively connected to each of a second set of the second plurality of antennas, the signal processor being further configured to process signals received on the second set of the second plurality of antennas during the plurality of integration periods, and for each of the plurality of integration periods and for each of the second set of the second plurality of antennas, to determine a measurement corresponding to each signal generated on each of the second set of the second plurality of antennas.

14. The method of claim 12, wherein each of the second set of the first plurality of antennas are moveable with respect to at least one of the second set of the first plurality of antennas due to deformation of the second structure.

15. The method of claim 12, wherein the signal processor is further configured to process signals received on the second set of the second plurality of antennas during the plurality of integration periods, and for each of the plurality of integration periods and for each of the second set of the second plurality of antennas, to determine a measurement corresponding to each signal generated on each of the second set of the first plurality of antennas.

16. The method of claim 12, wherein the signal processor is further operatively connected to each of a set of the second plurality of antennas, the set of the second plurality of antennas comprising at least two of the second plurality of antennas, the signal processor being further configured to process signals received on the set of the second plurality of antennas during the plurality of integration periods, and for each of the plurality of integration periods and for each of the set of the second plurality of antennas, to determine a measurement corresponding to each signal generated on each of the first set of the first plurality of antennas.

* * * * *